United States Patent

Takahashi

[11] Patent Number: 5,648,605
[45] Date of Patent: Jul. 15, 1997

[54] FLOWMETER CALIBRATION METHOD

[75] Inventor: Chiharu Takahashi, Ushiku, Japan

[73] Assignee: Agency of Industrial Science & Technology, Ministry of International Trade & Industry, Tokyo, Japan

[21] Appl. No.: 518,178

[22] Filed: Aug. 23, 1995

[30] Foreign Application Priority Data

Aug. 26, 1994 [JP] Japan .................... 6-225549

[51] Int. Cl.$^6$ .................................................. G01F 25/00
[52] U.S. Cl. ............................................ 73/197; 73/1.35
[58] Field of Search ........................... 73/197, 198, 202, 73/861.04, 3

[56] References Cited

U.S. PATENT DOCUMENTS

| | | | |
|---|---|---|---|
| 3,148,527 | 9/1964 | Lindquist et al. ................. | 73/3 |
| 3,330,156 | 7/1967 | Thomas ............................ | 73/197 |
| 4,590,790 | 5/1986 | Hicks et al. ..................... | 73/202 |

*Primary Examiner*—Richard Chilcot
*Assistant Examiner*—Harshad Patel
*Attorney, Agent, or Firm*—Oblon, Spivak, McClelland, Maier & Neustadt, P.C.

[57] ABSTRACT

A flowmeter calibration method includes disposing a flowmeter on a standard flowpath, disposing a flowmeter on each of a plurality of branch flowpaths in communication with the standard flowpath, using the flowmeters disposed on the flowpaths to vary a fluid flow through each flowpath and measuring each flow value, and comparing the plurality of flow values thus obtained to obtain the relative instrumental error of each flowmeter.

2 Claims, 2 Drawing Sheets

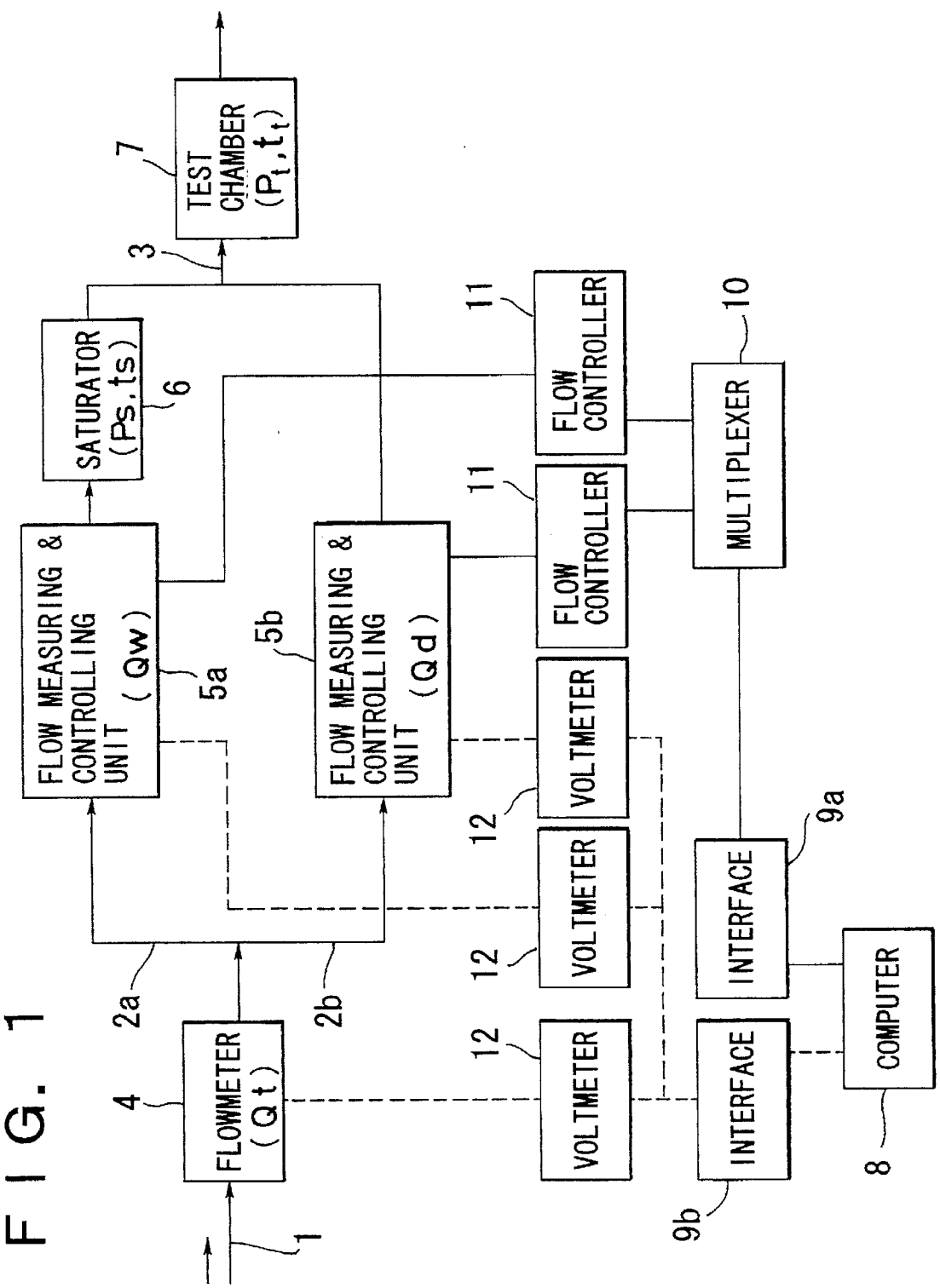

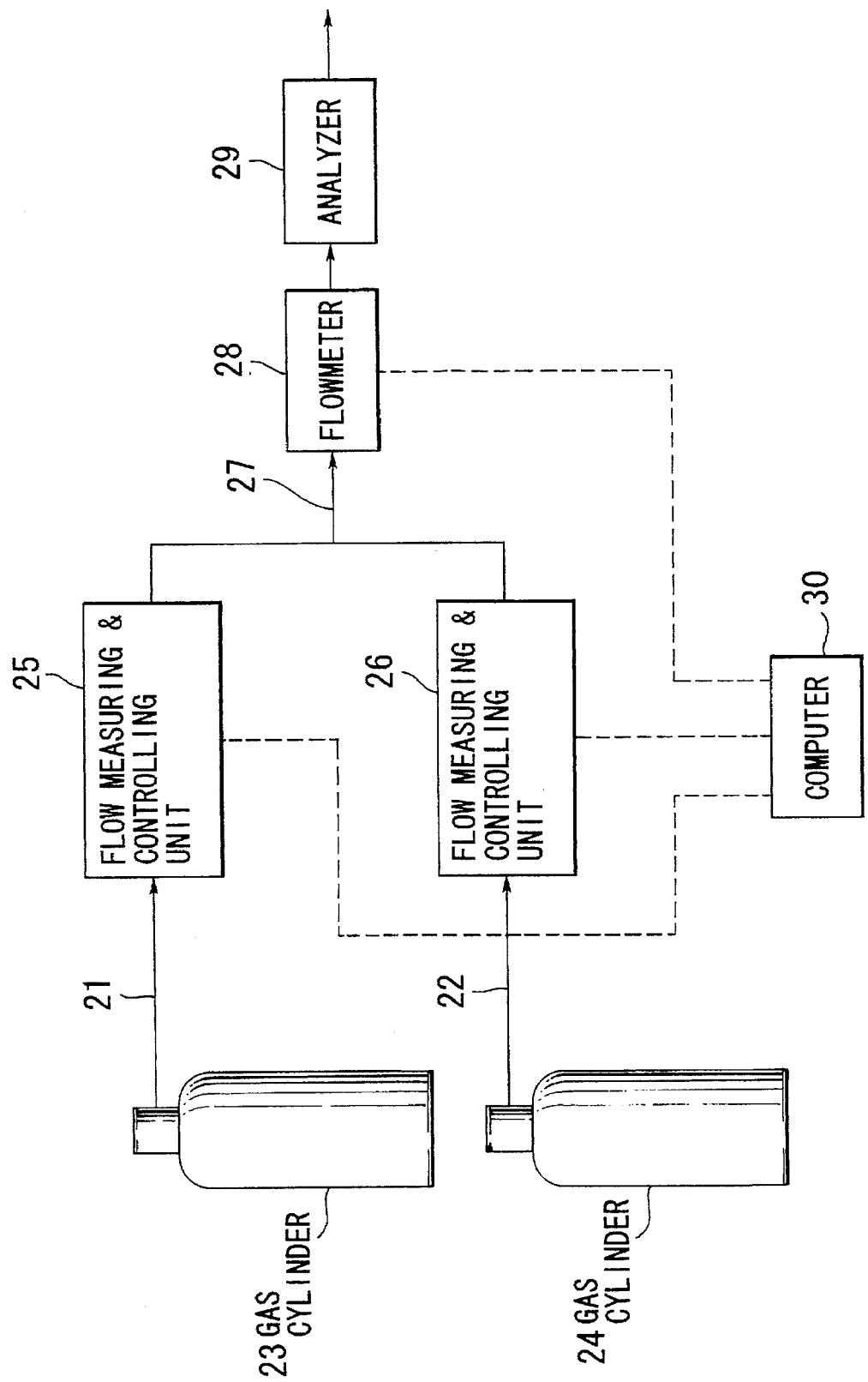

FLOWMETER CALIBRATION METHOD

BACKGROUND OF THE INVENTION

1. Field of the Invention

The present invention relates to a method for calibrating a flowmeter for measuring a prescribed amount of a divided-flow or mixed fluid such as when a gas or fluid supplied from one flowpath is made to flow along a plurality of divided flowpaths, or a gas or fluid supplied from a plurality of divided flowpaths is mixed in a mixing flowpath. This invention particularly relates to a method of controlling a flowmeter incorporated in a humidity generator or standard gas divider.

2. Description of the Prior Art

In the field of measuring technology using hygrometers, analyzers and the like, metering instruments are calibrated using standards, standard samples and the like. To calibrate hygrometers, for example, which are used in a great many industrial fields, a humidity generator is used to generate an atmosphere having a set humidity. In addition, standard gases (pure or mixed gases having a set concentration of a given component or components) are used for calibrating analyzers such as atmospheric pollution meters.

In accordance with Japanese Industrial Standard (JIS) B 7920-1994 "Hygrometers—Test method," a humidity generator based on a conventional divided flow method uses two flowmeters, in which a flow of dry air is divided into two, each flow is measured and controlled, and one of the air flows is saturated by water vapor in a saturator. The saturated air and the dry air are then mixed together and the mixture is fed into a test chamber to thereby generate air of the required humidity in the test chamber, and the hygrometers and/or humidity sensors are then calibrated. In accordance with JIS B 7920, the relative humidity in the test chamber is given by the following equation.

$$U = \frac{P_t \cdot \gamma}{P_S - (1-\gamma) \cdot e_S} \times 100 \, (\%) \quad (1)$$

In the above equation (1), U is relative humidity (%), $P_t$ is the pressure in the test chamber, $P_s$ is the pressure in the saturator, $e_s$ is the saturation vapor pressure of the air at saturator temperature $t_s$, and $\gamma$ is flow ratio. If the flow at the saturator is $Q_w$ and the flow of dry air is $Q_d$, the flow ratio $\gamma$ is obtained as follows:

$$\gamma = Q_w/(Q_w + Q_d)$$

A standard gas may be generated by the mass measuring method or by the flow measuring method. In the mass measuring method, a compressed gas cylinder is filled with a component gas and a dilution gas in sequence. A precision balance is used before and after the gas is loaded into the gas cylinder to calculate the mass of the gas and determine its concentration. The mass measuring method is highly reliable and is used for a primary standard gas. Carbon monoxide, carbon dioxide, sulfur dioxide and other such contamination gases are typical examples of a component gas. Nitrogen or air is usually used as a dilution gas. In the flow measuring method, the component gas and dilution gas flows are each measured, the gases are mixed together, and the concentration is calculated from the flow ratio. The flow measuring method can be used for unstable gases and highly reactive gases that cannot be handled by the mass measuring method. Standard gases obtained by the flow measuring method usually have a low concentration (from several percent to several ppm or below). Flowmeter error in the flow measuring method is strongly related to the flow ratio of the component gas and dilution gas, that is, to the mixed gas concentration error.

A standard gas divider is a device used to generate a standard gas that is a further dilution of an existing standard gas. A standard gas divider combines a standard gas compressed in a gas cylinder with a dilution gas in a set flow ratio. To calibrate an analyzer using a standard gas divider, a cylinder containing gas having a concentration corresponding to full-scale concentration is used to measure intermediate concentrations (standard gas mixed with dilution gas to produce one-fifth, two-fifths, three-fifths, four-fifths the full-scale concentration, for example). Therefore, the flow precision of each flowpath in the standard gas divider is strongly related to the precision of the mixed gas concentration.

Thus, an accurate flow ratio is required to ensure the reliability of the humidity value or gas concentration. With respect to the flowmeters, initial calibration and periodic calibrations are essential, but calibration after a flowmeter has been incorporated in a humidity generator or standard gas divider is a troublesome task. There is the burden of the flow calibration standard (standard flowmeter, standard vessel or other such calibration apparatus), and when an outside organization is called upon to calibrate the flowmeters, either the flowmeters have to be removed from the humidity generator or standard gas divider, or the entire apparatus has to be sent to the calibrating organization. This means either that the apparatus cannot be used during the calibration period, or, if the flowmeters are removed, there is a risk of fluid leaks from joints caused by the removal and reinstallation of the flowmeters.

It is also possible that when a humidity generator or standard gas divider is being used, the flowmeters will undergo change with the passage of time, or will malfunction. However, since such a malfunction or the like can be difficult for a user to detect, the apparatus might continue to be used and give incorrect readings until the next calibration. It is therefore possible that flow measurements may be unreliable, even immediately after flowmeter calibration.

The object of the present invention is to provide a flowmeter calibration method that enables flowmeters to be calibrated without removal from a humidity generator or standard gas divider, and without using another calibration apparatus.

SUMMARY OF THE INVENTION

In accordance with the present invention, the above object is attained by a flowmeter calibration method comprising disposing a flowmeter (such as supply flowmeter 4, for example) on a standard flowpath (dry air supply path 1, for example), disposing a flowmeter (such as first and second branch flow measuring and controlling units 5a and 5b, for example), on each of a plurality of branch flowpaths (first and second branch flowpaths 2a and 2b, for example) in communication with the standard flowpath, using the flowmeters disposed on the flowpaths to vary a fluid flow through each flowpath and measuring each flow value, comparing the flow values of each flowmeter, and using this comparison to obtain a relative instrumental error of each flowmeter.

In accordance with the flowmeter calibration method of this invention, by just providing a flowmeter on the standard flowpath in addition to the flowmeter already provided on each branch flowpath, measured values can be corrected with the branch flowpath flowmeters installed in the apparatus, without the use of another calibration apparatus.

The above and other objects and features of the present invention will become apparent from the following description made with reference to the accompanying drawings.

BRIEF DESCRIPTION OF THE DRAWINGS

FIG. 1 is a block diagram showing an embodiment of the flowmeter calibration method of this invention applied to a humidity generator; and FIG. 2 is a block diagram showing an embodiment of the flowmeter calibration method of this invention applied to a standard gas divider.

DESCRIPTION OF THE PREFERRED EMBODIMENTS

An embodiment of the invention will now be described with reference to the drawings. FIG. 1 shows an embodiment of the flowmeter calibration method of this invention applied to a divided flow humidity generator. A dry air supply path 1 constituting a standard flowpath is divided at the supply end into a first branch flowpath 2a and a second branch flowpath 2b. The other ends of the flowpaths 2a and 2b merge into a mixing flowpath 3. The supply flowpath 1 is provided with a supply flowmeter 4 and the first branch flowpath 2a is provided with a first branch flow measuring and controlling unit 5a that includes a flowmeter, and a saturator 6 as a water saturation means. The second branch flowpath 2b is provided with a second branch flow measuring and controlling unit 5b that includes a flowmeter. A test chamber 7 is provided on the mixing flowpath 3. Thus, air from the flowpaths 2a and 2b is mixed and supplied to the test chamber 7.

To calibrate the supply flowmeter 4 and the incorporated flowmeters of the first branch flow unit 5a and second branch flow unit 5b in the divided flow humidity generator thus configured, flow values are obtained from the supply flowmeter 4 arranged on the dry air supply path 1, the first branch flow unit 5a on the first branch flowpath 2a, and the second branch flow unit 5b on the second branch flowpath 2b, and these flow values are compared to obtain a relative instrumental error of each flowmeter. The flowmeters are controlled based on the instrumental errors thus obtained.

If the flow $Q_t$ obtained from the supply flowmeter 4 does not equal the sum of flows $Q_w$ and $Q_d$ from the first branch flow unit 5a and second branch flow unit 5b, it is taken to signify that there is an error (instrumental error) between the true flow and the indicated value. When this happens, by following known mathematical methods it is possible to obtain a relative instrumental error of each flowmeter from the measured values by changing the dry air flow along the supply flowpath 1 and the ratio of the air flows along the flowpaths 2a and 2b. Therefore, by controlling the flow along each path, taking this relative instrumental error into consideration, it becomes possible to form a reliable humidity generator having very high precision.

Thus, in accordance with this invention, each flowmeter can be calibrated without being removed from the apparatus and without having to suspend operation of the humidity generator for an extended period. The calibration is therefore straightforward and can be carried out without giving rise to problems such as fluid leaks caused by flowmeter removal. Also, by correcting flowmeter output values using the instrumental error obtained beforehand with the above calibration operation, an accurate humidity value can be ascertained, and an atmosphere that has the required humidity can be generated. Furthermore, by monitoring indicated readings of the three flowmeters during the operation of the humidity generator, and comparing supply flow $Q_t$ with saturator flow $Q_w$ plus dry flow $Q_d$, the operator can detect changes over time in a flowmeter or malfunctions owing to clogging or other such cause. This makes it possible to avoid using a humidity generator that is producing errors until flowmeter calibration is carried out, which is the case with conventional arrangements. Thus, good reliability of the humidity generator can be maintained.

The above type of divided flow humidity generator was fabricated to effect actual calibration measurement. A mass flowmeter was used as the supply flowmeter 4 to measure total dry air supply $Q_t$, and mass flow controllers were used as the first and second branch flow units 5a and 5b to measure and control flow $Q_d$ on the second branch flowpath 2b (dry) and flow $Q_w$ on the first branch flowpath 2a (saturator) side. The mass flowmeter used was a model SEF-510 manufactured by the Japanese company STEC Inc., while the mass flow controllers were models SEC-500 MK3 made by the same company. A stainless-steel pipe with an outside diameter of 0.25 inch was used to form the flowpaths. A computer 8 was used to acquire measured values, calculate instrumental error and set flow control values.

First, compressed dry air was adjusted to a set pressure (a gage pressure of approximately 0.2 MPa) by means of a pressure adjustment valve (not shown) to supply dry air to the dry air supply path 1. The dry air flows through flowmeter 4, where total flow $Q_t$ is measured, and then flows into the two branch flowpaths 2a and 2b. A dessicator using synthetic zeolite (molecular sieves) is used to dry the air to a relative humidity not exceeding 0.01%. Flows $Q_d$ and $Q_w$ of flowpaths 2a and 2b are then measured by the respective flowmeters. The mass flow controller is constituted by a mass flowmeter and a flow control valve, and automatically adjusts the flow so that the flowmeter output is the same as the set flow. The air ($Q_w$) passing through first branch flowpath 2a passes through the saturator 6 after emerging from the flowmeter, where it has been saturated with water vapor. In the mixing flowpath 3, this saturated air is mixed with dry air ($Q_d$) that passes through the second branch flowpath 2b, and the mixed air flows into the test chamber 7. In this way, an atmosphere having the specified humidity is obtained in the test chamber 7, and can be used as a humidity standard for humidity sensor calibration and the like.

The computer 8 designates set values for each flow controller 11, via an interface 9a and a multiplexer 10. Signals output from the flowmeters 5a and 5b are input to the computer 8 via digital voltmeters 12 and an interface 9b to automate flow measurement and control. In this way, complex flowmeter calibration operations are automated, enabling the recording of measured values and calculation and recording of correction values to be simplified. Moreover, flowmeter correction, calculation of humidity values from measured flow and temperature values and the operation of aligning humidity settings by flow controller adjustment can be done during operation of the humidity generator. This makes it possible to constitute the humidity generator as one that provides high-precision generation of an atmosphere with the required humidity.

A specific example of the flowmeter calibration method will now be described. As described above, if the three flowmeters are accurate, $Q_t$ should equal $[Q_w+Q_d]$, and if a difference is observed between the measured values of $Q_t$ and $[Q_w+Q_d]$, that difference can be used to obtain the relative instrumental error of each flowmeter.

First, the case in which the range of measurement of each flowmeter is the same (full scale; 10 l/min ones were used in experiments) will be described. With the full scale of each flowmeter divided into n parts, $Q_{wi}$ is the flowmeter output for a fluid flow of i/n of the full scale on the saturator side, $Q_{dj}$ is the output for a flow of j/n on the dry side, and the total measured flow value is $Q_{tk}$ (i+j=k, 0≤i, 0≤j, k≤n), instrumental errors (the differences between flowmeter values indicated and true values) at the n point of the full scale of the three flowmeters are taken as $w_i$, $d_j$, and $t_k$ respectively. Of these, instrumental errors $w_0$, $d_0$, and $t_0$ can be directly measured by stopping the flow to bring it to zero. In order to obtain an atmosphere of a required humidity, the only problem is the relative flow amounts of dry air and saturated air. Therefore, relative instrumental error can be found by taking a point on an arbitrary flowmeter as a standard point (for example, $w_n=0$ for the full scale point of the dry side flowmeter provided on the second branch flow unit 5b), and the unknown number (instrumental error) to be found is 3n−1.

If equation (2) is obtained from measured values when the actual fluid flow takes place, the relationship with flowmeter instrumental error is given by equation (3).

$$b_{ij} = Q_{wi} + Q_{dj} - Q_t, \ _{k=j} (0<i+j\leq n) \qquad (2)$$

$$b_{ij} = w_i + d_j - t_{i+j} \qquad (3)$$

If all i, j combinations are taken, the number of measured values is n(n+3)/2, and if n≥2, it will be larger than the number of unknowns, and therefore the unknowns can be determined by using the method of least-squares. If for example n=5, measurements will be taken twenty times and the number of unknowns will be 14; if n=10, there will be 65 measurements and the number of unknowns will be 29. Thus, with the increase in the number of divisions n, the number of measurements based on combinations of i and j increases. Therefore, using a computer to automate the procedure is very useful for reducing the complexity of the calibration operations while at the same time obtaining reliable calibration accuracy. Furthermore, with a humidity generator, a full-scale value is generally used for the flowmeter used to measure total flow, so the number of unknowns and number of measurements may be appropriately reduced without necessarily obtaining the total instrumental error $t_k$. When the calibration operation has been automated, there is no problem unless the number of points is very large.

The above explanation was made with reference to flowmeters having the same measurement range. However, the flowmeter calibration method of this invention can also be realized using flowmeters with mutually differing measuring ranges.

The procedure for calculating the method of least-squares will now be described. To begin with, unknown number vector x and measurement value vector b are defined by equations (4) and (5) respectively.

$$x = (t_1, t_2, \ldots, t_n, w_1, w_2, \ldots, w_{n-1}, d_1, d_2, \ldots d_n)^t \qquad (4)$$

$$b = (b_{10}, b_{01}, b_{20}, b_{11}, b_{02}, \ldots, b_{0n})^t \qquad (5)$$

In equations (4) and (5), the symbol t at the upper right denotes a transposed vector. Expressing equation (3) in matrix form produces equation (6).

$$b = Px \qquad (6)$$

Taking the case of n=5 as an example, equation (7) shows a specific expression of matrix P. Here, using $Q_{w5}$ as standard, $w_5=0$.

$$P = \begin{bmatrix} t_1 & t_2 & t_3 & t_4 & t_5 & w_1 & w_2 & w_3 & w_4 & d_1 & d_2 & d_3 & d_4 & d_5 \\ -1 & 0 & 0 & 0 & 0 & 1 & 0 & 0 & 0 & 0 & 0 & 0 & 0 & 0 \\ -1 & 0 & 0 & 0 & 0 & 0 & 0 & 0 & 0 & 1 & 0 & 0 & 0 & 0 \\ 0 & -1 & 0 & 0 & 0 & 0 & 1 & 0 & 0 & 0 & 0 & 0 & 0 & 0 \\ 0 & -1 & 0 & 0 & 0 & 1 & 0 & 0 & 0 & 1 & 0 & 0 & 0 & 0 \\ 0 & -1 & 0 & 0 & 0 & 0 & 0 & 0 & 0 & 0 & 1 & 0 & 0 & 0 \\ 0 & 0 & -1 & 0 & 0 & 0 & 0 & 1 & 0 & 0 & 0 & 0 & 0 & 0 \\ 0 & 0 & -1 & 0 & 0 & 1 & 0 & 0 & 0 & 1 & 0 & 0 & 0 & 0 \\ 0 & 0 & -1 & 0 & 0 & 1 & 0 & 0 & 0 & 0 & 1 & 0 & 0 & 0 \\ 0 & 0 & -1 & 0 & 0 & 0 & 0 & 0 & 0 & 0 & 0 & 1 & 0 & 0 \\ 0 & 0 & 0 & -1 & 0 & 0 & 0 & 1 & 0 & 0 & 0 & 0 & 0 & 0 \\ 0 & 0 & 0 & -1 & 0 & 0 & 1 & 0 & 1 & 0 & 0 & 0 & 0 & 0 \\ 0 & 0 & 0 & -1 & 0 & 1 & 0 & 0 & 0 & 1 & 0 & 0 & 0 & 0 \\ 0 & 0 & 0 & -1 & 0 & 0 & 0 & 0 & 0 & 0 & 0 & 1 & 0 & 0 \\ 0 & 0 & 0 & -1 & 0 & 0 & 0 & 0 & 0 & 0 & 0 & 0 & 1 & 0 \\ 0 & 0 & 0 & 0 & -1 & 0 & 0 & 0 & 0 & 0 & 0 & 0 & 0 & 0 \\ 0 & 0 & 0 & 0 & -1 & 0 & 0 & 1 & 1 & 0 & 0 & 0 & 0 & 0 \\ 0 & 0 & 0 & 0 & -1 & 0 & 1 & 0 & 0 & 1 & 0 & 0 & 0 & 0 \\ 0 & 0 & 0 & 0 & -1 & 0 & 1 & 0 & 0 & 0 & 0 & 1 & 0 & 0 \\ 0 & 0 & 0 & 0 & -1 & 1 & 0 & 0 & 0 & 0 & 0 & 1 & 0 & 0 \\ 0 & 0 & 0 & 0 & -1 & 0 & 0 & 0 & 0 & 0 & 0 & 0 & 0 & 1 \end{bmatrix} \begin{matrix} b_{10} \\ b_{01} \\ b_{20} \\ b_{11} \\ b_{02} \\ b_{30} \\ b_{21} \\ b_{12} \\ b_{03} \\ b_{40} \\ b_{31} \\ b_{22} \\ b_{13} \\ b_{04} \\ b_{50} \\ b_{41} \\ b_{32} \\ b_{23} \\ b_{14} \\ b_{05} \end{matrix} \qquad (7)$$

In accordance with the method of least-squares, instrumental error x can be estimated from equation (8). Here, the symbol t at the upper right denotes transposed matrix and −1 denotes inverse matrix.

$$x = (P^tP)^{-1}P^tb \qquad (8)$$

As described above, if the instrumental error is found for each flowmeter, the correct flow value when using a humidity generator (that includes a flowmeter) is obtained by deducting the instrumental error from the indicated flowmeter value. Therefore, by applying flow control of each flowmeter corrected to produce the correct flow value, highly accurate flow control can be exercised. Needless to say, based on the computed instrumental error, each flowmeter can be adjusted to a state in which accurate flow control is possible.

The derivation of equation (8) by the method of least-squares is as follows. If in the b=Px of equation (6), b' is taken as the estimated value of b based on the method of least-squares, then b'=Px. The residual vector Δ thereof is obtained by Δ=b'−b=Px−b, so the residual sum of squares $\Delta^2$ will be $$\Delta^2 = (Px - b)^2 = x^tP^tPx - 2 \cdot x^tP^tb + b^2$$

$$= \sum_{ij} x_i(P^tP)_{ij}x_j - 2 \cdot \sum_i x_i(P^tb)_i + b^2$$

If 0 is used as the result of applying $x_j$ to obtain a partial differential of $\Delta^2$, the result is the following equation.

$$\partial \Delta^2/\partial x_j = 2 \cdot \Sigma(P^tP)_{ij}x_j - 2 \cdot (P^tb)_j = 0$$

If the above is simplified as $(P^tP)x = P^tb$, equation (8) can be derived as instrumental error x.

Examples of the results of flowmeter calibration using the above operation are shown in Table 1. With respect to the measurements, the total flow was a stationary flow with adequate stability, and the three flowmeters were used to obtain 50 measured values in each case, at approximately 5 second intervals, and the average of these values was used to calculate the instrumental error. The flowmeter instrumental error was a maximum absolute value of approximately 0.23 l/min while the full scale is 10 l/min. The estimator instrumental error, based on the method of least-squares, was a maximum of around 0.002 l/min, and repeatability was a nominal 0.02 l/min (0.2% of the full-scale). Thus, the obtained instrumental error was up to ten times larger than that, showing the significance of the calibration.

TABLE 1

| i | Flow (l/min) | Flowmeter instrumental error (l/min) | | |
|---|---|---|---|---|
| | | $d_i$ | $w_i$ | $t_i$ |
| 0 | 0 | 0.004 | −0.030 | 0.014 |
| 1 | 2 | −0.021 | −0.041 | −0.067 |
| 2 | 4 | 0.013 | 0.011 | −0.097 |
| 3 | 6 | 0.039 | 0.007 | −0.130 |
| 4 | 8 | 0.081 | 0.036 | −0.141 |
| 5 | 10 | 0.049 | 0.000* | −0.232 |

*Using $Q_w$ full-scale value as standard.

In the humidity generator of the above embodiment, total flow is measured using the supply flowpath as the standard flowpath. However, the present invention can also be configured to acquire the total flow using the mixing flowpath 3 to the test chamber 7 as the standard flowpath. However, with a divided flow humidity generator, there is a concern over differences in flowmeter characteristics with respect to saturated air and dry air. In addition, when the mixed air is passed through a flowmeter, moisture adheres to the flowmeter interior which has a complex structure. Thus, as there is therefore a possibility of a lag in the humidity generation or of hysteresis occurring when the set humidity is changed, in this embodiment the air flow on the saturator side is measured before humidification.

In the above embodiment, the flowmeter calibration method according to this invention was applied to a humidity generator. However, the invention is not limited thereto and may for example be applied to a standard gas divider with the same effect. Thus, as shown in FIG. 2, a flow measuring and controlling unit 25 that includes a flowmeter is provided on a standard gas supply flowpath 21 arranged at one end of a standard gas cylinder 23. Also, a flow measuring and controlling unit 26 that includes a flowmeter is provided on a dilution gas supply flowpath 22 arranged at one end of a dilution gas cylinder 24. The other ends of the flowpaths 21 and 22 are connected to a mixing flowpath 27 equipped with a flowmeter 28. After the flow rate of the mixed gas has been measured by the flowmeter 28, the gas is fed to an analyzer 29. The measurement results of each flowmeter are sent to a computer 30. Thus, a flowmeter is provided on each of a plurality of gas supply flowpaths and a flowmeter is provided on the mixing flowpath that communicates with each gas supply flowpath. By comparing the sum of the supply flows with the flow in the mixing flowpath, the relative instrumental error of each flowmeter can be obtained, in the same way as in the case of the above humidity generator.

The present invention has been described with reference to the illustrated embodiments in which the flowmeter calibration method is applied to a humidity generator or standard gas divider having a single stage flowpath arrangement. It goes without saying, however, that the flowmeter calibration method according to the present invention is also applicable to a multistage humidity generator or multistage standard gas divider that combines multiple folwpaths.

With a standard gas generator based on the flow measuring method, the calibration method of this invention can be effectively used when there, is a large flow ratio (more than about 10%) between component gas and dilution gas. The present invention is particularly effective in the case of a divider that divides the concentration of gas in the cylinder into an integral ratio. In this case, the component concentration of the mixed gas in the cylinder is low and most of the physical properties are close to those of the dilution gas, so with respect to the flowmeters, differences in the types of gas do not constitute a problem.

Thus, as described in the foregoing, in the flowmeter calibration method according to this invention, as the sum of the flows in the branch flowpaths is the same as the flow in the standard gas flowpath, comparison of flow values obtained from each flowmeter allows relative instrumental errors to be found for each flowmeter. It therefore is possible to carry out calibration of the flowmeters without using an external calibration standard. Furthermore, the calibration can be carried out without removing the flowmeters from the humidity generator or standard gas divider or the like, eliminating the work of removing and refitting flowmeters and avoiding the leaks that can be caused by the work. Moreover, flowmeter correction can be done while the humidity generator or standard gas divider is being used, thereby ensuring the generation of a fluid with an accurate humidity or concentration value. Also, changes over time in a flowmeter or malfunctions owning to clogging or other such cause during use of the humidity generator or standard gas divider can be detected, which contributes to raising the reliability of the apparatus.

When normal flowmeter calibration can be carried out using just the full scale value of a flowmeter as a standard, applying the calibration method of this invention enables instrumental error at intermediate points to be obtained by comparison.

What is claimed is:

1. A flowmeter calibration method comprising the steps of:

disposing a first flowmeter on a common flowpath for measuring a flow value of a fluid flowing through said common flowpath;

disposing second flowmeters one on each of a plurality of branch flowpaths in communication with said common flowpath for measuring flow values of fluids flowing through said plurality of branch flowpaths and obtaining a sum of said flow values;

comparing said flow value measured by said first flowmeter with said sum obtained to obtain a first comparison value;

varying a fluid flow through each of said branch flowpaths and measuring each flow value; and comparing a plurality of flow values thus measured with said flow value measured by said first flowmeter to obtain second comparison values, thereby obtaining a relative instrumental error between said first flowmeter and each of said second flowmeters from said first and second comparison values.

2. A flowmeter calibration method according to claim 1 wherein the flowmeters have a same measurement range.

* * * * *